United States Patent Office 3,121,630
Patented Feb. 18, 1964

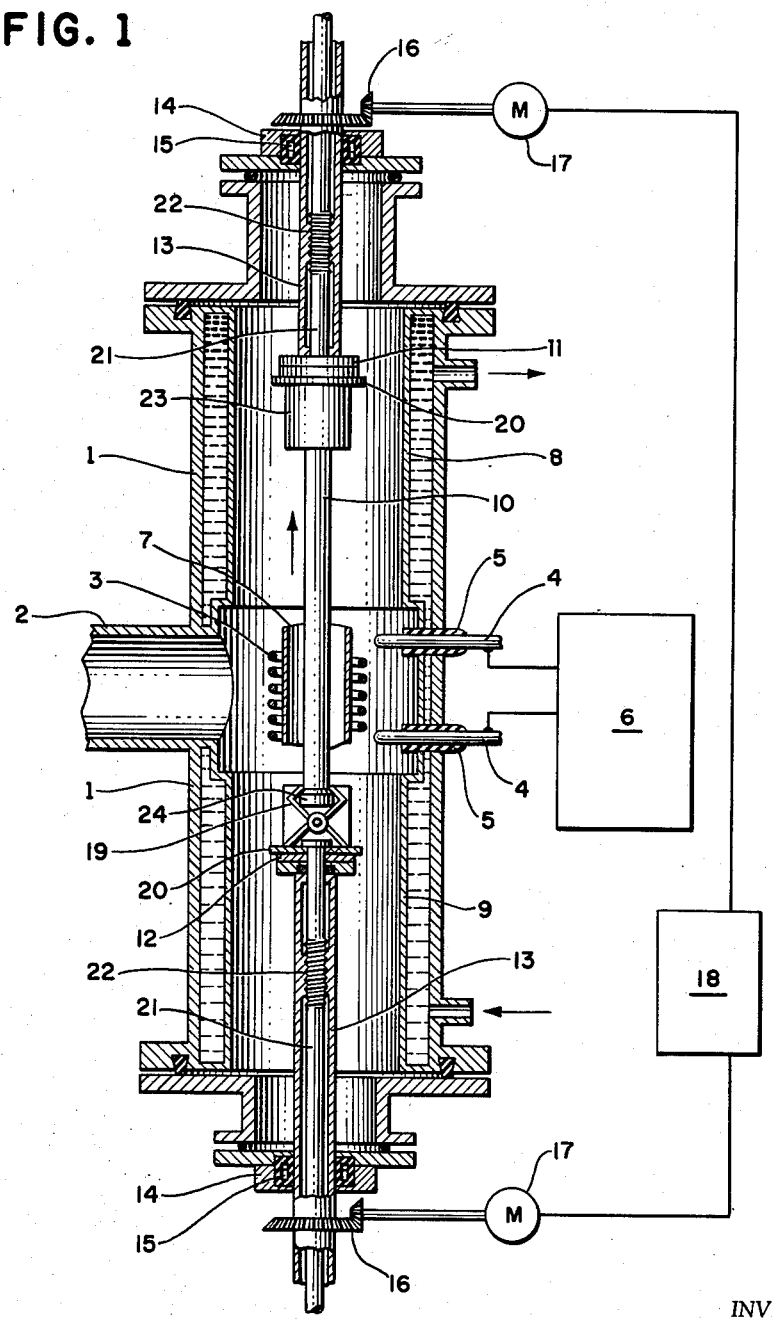

3,121,630
METHOD AND APPARATUS FOR SINTERING PREMOLDED OBJECTS
Adrien Bussard, La Celle-Saint-Cloud, Seine-et-Oise, France, assignor to W. C. Heraeus G.m.b.H., Hanau (Main), Germany, a corporation of Germany
Filed Nov. 9, 1959, Ser. No. 851,846
Claims priority, application Germany Nov. 12, 1958
17 Claims. (Cl. 75—200)

The present invention relates to a new method of sintering premolded objects, especially those of a considerable length and thickness and particularly under a vacuum, and to an apparatus for carrying out this new method.

In the sintering methods which were known prior to this invention, the respective molded element was secured in a fixed position by two or more holding means and then heated in its entirety to the sintering temperature. After being sintered, the molded element was also cooled in its entirety. Such heating did, however, not affect all of the parts of the molded body uniformly since at those points where the body was secured, the holding means withdrew a considerable amount of heat. This became noticeable especially when the molded body was heated by a direct passage of the electric current therethrough, which required a very high amperage and, in turn, very extensive contact surfaces. This resulted in the well-known and very serious difficulties which always occur when strong curents are to be transferred to conductive bodies of different dimensions and varying properties of their material.

The known methods, especially when the sintering process was carried out in a vacuum and by an apparatus of reasonable dimensions, only permitted a sintering of molded products up to a certain size since the sintering of still larger bodies would involve a thermal load beyond that which could be carried by such an apparatus. In fact, an even larger and more expensive apparatus of the known type would not permit any further substantial increase in the size of the body to be sintered.

The permissible dimensions of the molded body to be sintered according to the known methods were further limited by the fact that the high electric energy required for heating the body could be conducted into the apparatus only with the greatest of difficulties. The apparatus which have previously been built for sintering larger molded bodies often required such an amount of electric energy that it often taxed the limits even of large public electric plants and rendered a production in smaller, more remote places or a further development of such production methods virtually impossible.

The known methods had the further disadvantage that the size of the body to be sintered was also limited by the output of the available vacuum pumps. A sintering process usually results in a reduction of the oxygen content of the respective body to be sintered, especially if it consists of tantalum, niobium, or the like. This reduction of the oxygen content is generally due to reactions of carbon monoxide which, in turn, means that the carbon monoxide and carbon dioxide gases must be continuously pumped off and that an equilibrium of pressure of $10^{-5}$ mm. Hg or even less must be maintained. This could previously only be attained by means of vacuum pumps with a very high suction output, for example, 100,000 liters per second at a presure of $10^{-5}$ mm. Hg. However, even with such extremely large and unhandy pumps which consume great amounts of energy, the known methods only permitted a sintering of molded bodies of a limited size. It was also not possible to replace the required high pump output by increasing the length of the sintering period since such an increase would, in turn, result in an undesirably strong crystalline growth of the material of the sintering body which may diminish its quality.

A further very serious disadvantage of the sintering methods as previously applied consisted in the fact that the body to be sintered could not be heated at its supporting points to the same high temperature as at the other points. Consequently, the respective parts at which the sintered body was supported had to be subsequently removed and discarded as waste, which was especially undesirable if the molded body consisted of an expensive material such as tantalum or niobium.

It is an object of the present invention to provide a new sintering method which fully overcomes all of the above-mentioned disadvantages in a very simple manner, and also to provide a suitable apparatus for carrying out this new method.

The method according to the invention broadly consists in heating the molded body to the required sintering temperature at consecutive zones or areas and in also maintaining the body at these areas under the sintering temperature for the required length of time, while moving the molded body and the heating means relative to each other.

By this procedure it is possible to carry out a proper sintering process on molded bodies of such a large size as could previously hardly be sintered in any vacuum apparatus, and it is further possible to do this by means of relatively small apparatus and relatively small, momentary amperages. The present invention thus permits to operate the apparatus with a reasonable thermal load, even though the molded bodies to be sintered may be of very great dimensions. Since by sintering the respective body at different zones rather than simultaneously in its entirety, the amount of material which is at one particular time in the sintering condition is relatively small, it is possible during the required carbon monoxide reactions to maintain the necessary low equilibrium of pressure by means of vacuum pumps of a relatively small suction output. Looking upon the individual parts of the body which are being sintered, the sintering period is rather shortened than increased, that is, the period within which a part of the material is in the sintering condition may be set to a definite value much more accurately than according to the previous methods, independently of the thermal load upon the apparatus and independently of the pump output. The sintering process according to the invention may thus also be controlled much more accurately than previously possible with the result that the sintered product is of a considerably higher quality. Naturally, this refers to the local sintering period of the individual zones and not to the total sintering period of the entire molded body which is actually longer than in the previous methods since all of the zones of the respective body are treated consecutively, rather than simultaneously. This has, however, no detrimental effect upon the sintered body itself. Also the increase in the length of production does not constitute any disadvantage since the method according to the invention permits the application of a considerably smaller apparatus and such an apparatus may be operated more economically than the previous apparatus despite the increase in the total sintering period.

According to a preferred embodiment of the invention, the molded body to be sintered and the heating means are to be moved relative to each other at a speed which is adjustable in such a manner that each point of the molded body will be maintained at the sintering temperature for a length of time adequate for a proper sintering of the material.

This last-mentioned embodiment of the invention has the advantage that it permits the local sintering time to be easily regulated and adjusted. If the relative movement between the body to be sintered and the heating means is made continuous, the further advantage will be attained that the molded body will pass gradually from one sintering zone to the other so that the sintered product will actually be sintered uniformly along its entire length. The continuous relative movement has the additional advantage that such a movement may be carried out with relatively simple and inexpensive means and at a lower consumption of power. A special advantage of the continuous relative movement is also attained if it is the molded body to be sintered rather than the heating means which is moved, since any jerky movement of this body which might cause a deformation thereof while it is in the sintering condition will then be avoided.

For some purposes, it is, however, advisable and possible to carry out the relative movement between the molded body and the heating means intermittently, that is, by steps. Such an intermittent relative movement may then be arranged so that one sintering zone immediately follows the preceding sintering zone. However, it is also possible to modify the movement, for example, by arranging the successive sintering zones for special purposes so that a gap is left between them which is taken care of during the next sintering step or cycle. In order to insure an accurate connection between one zone and another when an intermittent relative movement is applied, the various steps in this movement should be adjusted so that the individual sintering zones will overlap at least to a slight extent.

In some cases, it may also be advisable to provide within the effective range of the heating means a temperature gradient which insures a sufficiently continuous transition of temperature from the sintering zone to the zone which has not as yet been treated and to the zone which has already been sintered. It is, however, also possible to vary the temperature of the heating means at different times.

A further possibility of applying the invention consists in subjecting each zone to a multiple-stage sintering treatment at suitable time intervals between the various stages. It is thus possible to produce sintered products of a very high quality in a very simple manner. Different sintering conditions may also be applied at each of the stages. Thus, for example, when sintering under reducing conditions, the sintering temperature applied at every subsequent sintering stage may be adjusted so as to be higher than at the previous stage.

According to a preferred embodiment of the invention, the relative movement is produced by moving the molded body to be sintered past the heating means. By mounting these heating means in a stationary position, it is possible to provide an apparatus of a relative simple structure.

In order to avoid any amount of material from being wasted, it is advisable to support the body to be sintered by a plurality of securing devices which are adapted to carry out a movement relative to the heating means, to disconnect the respective securing device from the workpiece which approaches the effective range of the heating means, and in place of this securing device, to apply another securing device at the zone which has already been sintered and moves away from the heating means. The molded body will thus be moved past or through the heating means without any danger that the securing device will be affected by any temperatures which might cause any damage thereto.

A very frequent case in which the present invention is to be applied consists in sintering rod-shaped elements. The respective molded element is then preferably disposed in a vertical position and provided at each end with a securing device, whereupon, starting at one end, the rod is sintered at separate zones by a movement relative to the heating means. The securing device provided for the end of the rod where the sintering process is started is, however, at first not applied to this end but held at a sufficient distance from the heating means. As soon as this end of the rod reaches the securing device, it is gripped thereby, while the securing device attached to the other end of the rod is released therefrom when it approaches the heating means and is stopped at a sufficient distance from the latter. The molded body may in this manner also be passed several times back and forth through the heating means, one securing device then gripping one rod end when the other securing device releases the other end.

In some instances it may also be advisable to apply additional supporting means on those points of the workpiece on which the securing devices engage, and to remove these supporting means after the sintering. Such additional supporting means will prevent any possible deformation of the workpiece due to the gripping engagement of the securing devices.

After the workpiece has been completely sintered, it may, according to the invention, be further subjected at different or consecutive zones to a supplementary heat treatment.

The apparatus which is especially suitable for carrying out the method according to the invention comprises an evacuated vessel which contains suitable heating means mounted in a stationary position therein so that the molded workpiece to be sintered may be moved through the vessel past these heating means, and also contains at least two movable securing devices for the workpiece which preferably lead to the outside of the vessel where they are connected to a suitable mechanism for moving the workpiece. Such an apparatus may be easily designed to carry out the inventive method very quickly, securely, and in a very simple manner.

The heating means of the apparatus may consist of an induction coil through the inside of which the workpiece may be moved. The method according to the invention permits in practically all cases, in which an electrically conductive material is to be sintered, to apply induction coils of a very high efficiency, whereas in the sintering methods which were known prior to this invention it was practically impossible to apply induction coils especially for treating larger workpieces since this required such strong induction currents which rendered the method impractical and could only be conducted with great difficulties into a vacuum apparatus.

The securing devices for holding the workpiece may consist of claws which are movable in a vertical direction and are disposed in directly opposite positions within the upper and lower parts of the vacuum vessel. These claws are provided with connecting and guiding means which extend through the walls of the vacuum vessel to the outside, and they are also operated from the outside.

The use of a somewhat similar apparatus is already known for melting materials in consecutive zones so as to remove traces of impurities from otherwise pure materials, such as silicon or germanium. These apparatus differ, however, in many important respects from the present invention, and primarily by being designed to accomplish an entirely different object, namely, to purify these prerefined materials further by a melting process which is carried out in stages or zones by dissolving the impurities within the melting zone and passing the same with the moving zone to one end of the rod-shaped workpiece. Since in this prior method it is necessary to melt the material in order to attain an extreme purification thereof, it also means that the workpiece will become deformed. In the method according to the present invention, it is, however, of the greatest importance that any melting and any substantial deformation of the workpiece in the heated zone will be absolutely avoided since the respective product when in its final sintered condition should correspond as closely as possible to its premolded condition before being sintered.

It should further be noted that the known zonal melting process is applicable in actual practice only to rod-shaped parts of a comparatively small cross section, that is, so-to-speak, to those of laboratory dimensions, since these parts which are used for semiconductors, transistors, and the like only have an extent of a few millimeters so that, in view of the high degree of purity attained, the removal of the impure end portion is of no particular importance. The zonal sintering method according to the present invention, however, is primarily intended for a large-scale production, that is, for the economic production of sintered parts of dimensions having a cross sectional area upwardly of about 10 cm.$^2$ and a length of about 50 cm. and more. The invention therefore concerns the sintering of premolded parts of such dimensions that, if attempted by one of the previous methods and apparatus, it would result in such a considerable radiation from the entire surface area of the treated part that the expense of its operation would render such a method and apparatus entirely uneconomical. It is in this connection also important that, according to the invention, the entire workpiece will be sintered and that no untreated parts thereof have to be removed.

The zonal sintering method according to the invention differs furthermore from the known zonal melting process by the important fact that the temperatures applied are considerably lower than the melting temperature and may vary within considerable limits. In the zonal melting process, however, it is necessary to exceed the melting temperature, and by a very particular value so that the impurities will at first completely dissolve in the molten mass and subsequently will not become segregated therefrom when the molten mass cools off and solidifies. The known process therefore requires very sharply defined temperature limits which are much more critical than those in the method according to the invention.

Also the heating period has an entirely different effect in the two methods. In the zonal melting process, the minute, finely dispersed impurities dissolved practically immediately and remain integrally combined with the material in the melting zone when the latter rather quickly solidifies. The zonal sintering method according to the invention, however, requires a treatment of each premolded part for a much greater length of time since the particles of the material have to be allowed a sufficient crystalline growth.

The above-mentioned and other objects, features, and advantages of the present invention will become further apparent from the following description which is to be read with reference to the accompanying diagrammatic drawing of an apparatus which is adapted to carry out the inventive method but constitutes merely an example of the apparatus suitable for this purpose.

The apparatus illustrated diagrammatically and in cross section essentially consists of a vacuum vessel 1 which is connected by a conduit 2 to a vacuum pump or other vacuum-producing apparatus, not shown, which is adapted to maintain on the inside of vessel 1 a pressure of about $10^{-5}$ mm. Hg. The central part of vacuum vessel 1 contains an induction coil 3 which is mounted therein in a stationary position and the current conductors 4 of which extend through sealed insulators 5 in the wall of vessel 1 to the outside thereof where they are connected to an apparatus 6 for producing an induction current which, aside from a generator, also contains condensers for producing an electric oscillatory circuit with induction coil 3.

The induction coil 3 as well as its connecting conductors 4 may be made of a tubular structure so as to permit cooling water to be passed therethough.

For increasing the heat output, suitable reflectors, as shown for example at 7, may be provided within the coil or above or below it. Also, above and below the induction coil 3, cooling jackets 8 and 9 may be provided at the inside of vacuum vessel 1 for circulating cooling water between them and the outer walls of the vacuum vessel.

In order to pass a premolded workpiece 10 through the induction coil 3, the upper and lower parts of vacuum vessel 1 contain securing devices 11 and 12 which are slidable in the vertical direction and each of which is provided with a tubular member 13 which is slidably guided in suitable sealing means 14 in the opposite end walls of vessel 1 which may also include a vacuum chamber 15 as conventional in vacuum apparatus. Each of the tubular members 13 may be moved upwardly and downwardly through a suitable gearing 16 by a motor 17. Both of these motors 17 and the sequence of the movement of the tubular members 13 may be controlled by a control unit 18.

Each securing device 11 and 12 essentially consists of a scissorlike claw member 19 which is connected by a sliding plate 20 with a control rod 21 which, in turn, is slidably mounted within the tubular member 13 by interengaging screw threads 22 so that, when control rod 21 is turned from the outside of the vacuum vessel 1 relative to the tubular member 13 by suitable means, not shown, it will shift in the longitudinal direction within member 13, whereby sliding plate 20 will act upon claw member 19 to open or close the same. In order to provide the workpiece 10 with a better support in the securing devices 11 and 12, the scissorlike claw members 19 thereof are each enclosed by a guide member 23 in which the arms of the respective claw member 19 are pivotably mounted and which has an aperture 24 for receiving the workpiece 10.

The drawing illustrates the apparatus in the position in which the upper securing device 11 has just gripped the workpiece 10 on its sintered part, while the lower securing device 12 has approached the induction coil 3 to the extent beyond which it should not be moved so as not to be unduly affected by the sintering temperature. For this reason, the lower claw member 19 has been opened so that, at a further movement of the upper securing device 11 in the upward direction, workpiece 10 will be withdrawn from the lower securing device 12 and passed completely through the inside of induction coil 3 so as to be sintered completely to its very end.

The following example is given to illustrate the great advantages of the method according to the invention in numerical values over the sintering methods as previously known.

For sintering, for example, a tantalum rod of a length of 60 cm., a width of 6 cm., and a thickness of 2 cm., the previously known methods required the following apparatus:

The withdrawal of the carbon monoxide reaction products which are formed during the sintering treatment required a diffusion pump with a suction output of about 40,000 liters per pound, while for heating the tantalum rod to the sintering temperature a resistance-heating unit was required with a power consumption of about 300 to 350 kw. This means that, when heating with an alternating current of 10 to 12 volts, the current which had to be conducted into the vacuum apparatus had to have a strength of about 25,000 amperes. The operation further required a very great amount of cooling water since the temperature of the latter, and thus of the current-conducting gripping jaws had to be prevented from increasing considerably more than 20° C. After the treatment by the known method, a length of about 12 cm. or about 20% of the tantalum rod of 60 cm. length had to be discarded as waste because of the two unsintered ends of the rod.

On the other hand, the sintering treatment of a tantalum rod of the same length, width, and thickness as stated above requires according to the new method only an apparatus with a diffusion pump with a suction output of 10,000 liters per second. The zonal method of heating the tantalum rod further permits the application of an induction coil with an active current of 200 amperes and a current in the oscillatory circuit of 2,000 amperes in order to produce a thermal power of 50 kw.

Aside from the considerably simpler and less expensive apparatus required for carrying out the new method, the same also permits the treatment of rods of tantalum or similar materials of a still much greater length than mentioned in the above example, and without requiring any increase in the given dimensions of the apparatus. Furthermore, it constitutes a very important advantage of the new method that the respective workpiece may be sintered entirely without any waste and that the same apparatus may be used for sintering workpieces of different dimensions.

Although my invention has been illustrated and described with reference to the preferred embodiment thereof, I wish to have it understood that it is in no way limited to the details of such embodiment, but is capable of numerous modifications within the scope of the appended claims.

Having thus fully disclosed my invention, what I claim is:

1. A method of producing gas-free sintered objects relatively longer than the area in which it is sintered, comprising the steps of supporting in an evacuable vessel containing induction heating means, a premolded object such that the portion between the ends thereof is unsupported, evacuating said vessel and maintaining a required vacuum in said vessel, heating said object under said vacuum to the required sintering temperature consecutively at different zones thereof by moving said object and said heating means relative to each other, and maintaining the object at each zone at the sintering temperature for the period required for sintering the same.

2. A method as defined in claim 1, in which said steps are carried out by moving the object to be sintered and the required heating means relative to each other at a steady motion, and in adjusting the speed of said motion so that each point of said object will be maintained at the sintering temperature for a sufficient period to sinter the material.

3. A method as defined in claim 1, in which said steps are carried out by moving the object to be sintered and the required heating means relative to each other at an intermittent motion.

4. A method as defined in claim 3, in which, at said intermittent motion, one sintering zone of said object follows the adjacent preceding zone.

5. A method as defined in claim 3, in which, at said intermittent motion, one sintering zone of said object follows the adjacent preceding zone but so that said two zones slightly overlap each other.

6. A method as defined in claim 1, in which a temperature gradient is provided within the actual effective range of the required heating means, so as to insure a sufficiently steady change of temperature from the sintering zone of said body to the following zone to be sintered and to the adjacent zone already sintered.

7. A method as defined in claim 1, in which the sintering temperature is varied during the sintering of the different zones of said object.

8. A method as defined in claim 1, in which each zone of said object is subjected to several sintering steps at different times.

9. A method as defined in claim 8, in which each sintering step is carried out at different sintering conditions.

10. A method as defined in claim 9, in which, when sintering said object under reducing conditions, each sintering step is carried out at a temperature higher than that of the preceding step.

11. A method as defined in claim 1, in which said relative movement is carried out by moving said object past the required heating means.

12. A method of crucible free sintering premolded objects, especially those of substantial dimensions, comprising the steps of supporting the object such that the portion between the ends thereof is upsupported, holding the object to be sintered near one end, independently moving said object and the required heating means relative to each other so as to heat said object to the required sintering temperature for said object, consecutively at different zones thereof, holding said object near the other end and releasing said first end when said other end after being sintered has moved past said heating means, and moving the released part of said object past said heating means.

13. A method as defined in claim 12, in which said object is moved longitudinally relative to said heating means in a vertical direction, and in which said first end of said object is released when approaching a point near said heating means but spaced sufficiently therefrom so that the means for holding said object will not be unduly affected by said heating means.

14. A method as defined in claim 13, in which said object and said heating means are moved repeatedly relative to and past each other, and in which at each movement the end of said object approaching said heating means is released while the other end is being held.

15. A method as defined in claim 13, further comprising the step of withdrawing said holding means from said heating means after releasing said object.

16. A method as defined in claim 1, further comprising the step of subjecting said body after being finally sintered to a subsequent heat treatment at different zones thereof.

17. A method as defined in claim 1, in which said zonal sintering treatment of said object is carried out in a vacuum.

References Cited in the file of this patent

UNITED STATES PATENTS

| | | |
|---|---|---|
| 1,816,253 | Girshowitch | July 28, 1931 |
| 2,225,424 | Schwarzkopf | Dec. 17, 1940 |
| 2,739,088 | Pfann | Mar. 20, 1956 |
| 2,746,740 | Weaver | May 22, 1956 |
| 2,792,302 | Mott | May 14, 1957 |
| 2,807,542 | Frank | Sept. 24, 1957 |
| 2,930,098 | Emeis | Mar. 29, 1960 |

OTHER REFERENCES

Antill et al.: "Zone Sintering," pub. in Powder Metallurgy, 1958, No. 1/2, pages 133–142 (contribution to an informal discussion on developments in the practice of compacting and sintering held on March 19, 1958).